(12) United States Patent
Maggi

(10) Patent No.: US 10,545,356 B2
(45) Date of Patent: Jan. 28, 2020

(54) APPARATUS FOR IMPROVING VISION ACUITY IN POINTS OF INTEREST OF THE VISUAL FIELD

(71) Applicant: Sergio Maggi, San Mateo, CA (US)

(72) Inventor: Sergio Maggi, San Mateo, CA (US)

(73) Assignee: Sergio Maggi, San Mateo, CA (US)

( * ) Notice: Subject to any disclaimer, the term of this patent is extended or adjusted under 35 U.S.C. 154(b) by 0 days.

(21) Appl. No.: 16/419,443

(22) Filed: May 22, 2019

(65) Prior Publication Data

US 2019/0271860 A1 Sep. 5, 2019

Related U.S. Application Data

(62) Division of application No. 16/160,394, filed on Oct. 15, 2018, now Pat. No. 10,345,624, which is a (Continued)

(51) Int. Cl.
*G02C 7/10* (2006.01)
*G02C 7/16* (2006.01)

(52) U.S. Cl.
CPC ............ *G02C 7/105* (2013.01); *G02C 7/102* (2013.01); *G02C 7/104* (2013.01); *G02C 7/16* (2013.01); *G02C 2202/06* (2013.01)

(58) Field of Classification Search
CPC ........ G02C 7/105; G02C 7/102; G02C 7/104; G02C 7/16; G02C 2202/06
(Continued)

(56) References Cited

U.S. PATENT DOCUMENTS 5,402,189 A 3/1995 Gill
7,719,761 B2 5/2010 Lau
(Continued)

FOREIGN PATENT DOCUMENTS

WO 2015/044354 A1 4/2015

OTHER PUBLICATIONS

Notification of Transmittal of the International Search Report and Written Opinion of the International Searching Authority, or the Declaration for International Patent Application No. PCT/US2017/016867 dated Apr. 17, 2017, 9 pages.
(Continued)

*Primary Examiner* — Wen Huang
(74) *Attorney, Agent, or Firm* — Kilpatrick Townsend & Stockton LLP

(57) ABSTRACT

Eyewear for enhancing the contrast sensitivity of the human vision system through the use of lenses subdivided in areas of different light filtration properties arranged in specialized patterns, called multi-filters patterns, are provided. Of the multiple filtration areas, or filters, that compose each multi-filters patterns, one or more filters heavily reduces or totally block light arriving from some areas of the visual field of the eyes, while other filters lightly reduce or totally allow light from other areas of the same visual field. The resulting effect is to drive the auto-exposure function of the eye-brain vision system to adapt itself to areas of interest of the visual field thus improving contrast sensitivity and vision acuity in those areas while reducing or blocking light and glare from the rest of the visual field. The "multi-filters pattern" technology of the present invention can be implemented in lenses of stand-alone eyewear or as attachable "clip-on" lenses, to provide vision acuity improvement to stand-alone eyewear.

10 Claims, 7 Drawing Sheets

Related U.S. Application Data division of application No. 15/336,651, filed on Oct. 27, 2016, now Pat. No. 10,120,205.

(60) Provisional application No. 62/304,780, filed on Mar. 7, 2016.

(58) Field of Classification Search
USPC .................................................. 351/159.64
See application file for complete search history.

(56) References Cited

U.S. PATENT DOCUMENTS

| | | |
|---|---|---|
| 10,120,205 B2 | 11/2018 | Maggi |
| 10,345,624 B2 | 7/2019 | Maggi |
| 2012/0120365 A1 | 5/2012 | Legerton et al. |
| 2015/0261010 A1 | 9/2015 | Kudla et al. |
| 2016/0202497 A1 | 7/2016 | Hue |
| 2019/0049753 A1 | 2/2019 | Maggi |

OTHER PUBLICATIONS

U.S. Appl. No. 15/336,651 Restriction Requirement dated Mar. 14, 2018, 5 pages.
U.S. Appl. No. 15/366,651 Non-Final Office Action dated May 4, 2018, 13 pages.
U.S. Appl. No. 15/366,651 Notice of Allowance dated Sep. 21, 2018, 10 pages.
U.S. Appl. No. 16/160,394 Notice of Allowance dated Feb. 27, 2019, 11 pages.

APPARATUS FOR IMPROVING VISION ACUITY IN POINTS OF INTEREST OF THE VISUAL FIELD

CROSS-REFERENCES TO RELATED APPLICATIONS

This application is a divisional of U.S. application Ser. No. 16/160,394, filed Oct. 15, 2018, which is a divisional of U.S. application Ser. No. 15/336,651, filed Oct. 27, 2016, which claims priority to provisional U.S. Application No. 62/304,780, filed Mar. 7, 2016, both of which are incorporated herein by reference in their entirety for all purposes.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

Field of the Invention

The present invention is related to the field of vision enhancement and particularly to methods that use light filters, hereinafter "filters," to enhance vision acuity, and more specifically it relates to methods that use filters to increase contrast sensitivity by lowering the sensitivity threshold which is the smallest difference in light intensity needed by the human vision system to discriminate between an object and its background of the same color hue.

In the back of the eye, the retina has more than one hundred million photoreceptors, light sensitive cells of two types, rods and cones, capable of converting light into image data and capable of sending these data to the brain via an optic nerve signal. The brain decodes the image data and composes two images that, united, form a three-dimensional picture of the outside world enclosed in the visual fields of the two eyes.

Like an electronic digital camera, the vision system has an auto-exposure function, generally called eye adaptation capability, which controls physical and chemical components of the eye to adapt to a very wide range of ambient light conditions.

The auto-exposure function attempts to keep the optic nerve signal in the middle of its value range. A small and weak signal, resulting from an insufficient collection of light, will yield a dark and underexposed image, while a signal so large to be close to the maximum of its value range, caused by an excessive collection of light, will result in a bright and over-exposed image, possibly with glare.

To achieve the goal of best possible data and image the auto-exposure function controls three parameters: the size of the eye opening to the outside or aperture, or iris, the light-to-signal conversion rate, or photoreceptors sensitivity, and the period of light collection, or integration tine.

In very low light conditions the auto-exposure parameters are set close to the maximum of their range to maximize the amount of light to be collected and, vice versa, in very bright conditions they are set close to their minimum to avoid excessive light collection and glare. In intermediate situations the parameters are set to yield a mid-range optic signal.

Description of the Related Art

Scientists use many three-dimensional spaces to identify colors. In each of these spaces colors are defined by three coordinates. A 3×3 transformation matrix can be used to translate the coordinates of one space to a new one. The best-known color space is the RGB (Red, Green and Blue) made of the three colors to which the color sensitive photoreceptors, the cones, are most sensitive to.

The color space used for the description of this invention is the CIE 1931 xyY color space where x and y define the chromatic part of a color and Y is the "luminance", a photometric quantity related, but not equal, to "brightness as it will be described later in the description. In loose terms "brightness" is the human perception of luminance.

"Contrast" is the perception of the difference in brightness or in color that makes vision possible. However, in the description of the current invention and unless otherwise noted, "contrast" will mean only a difference in luminance or brightness.

A healthy eye and vision system can discriminate differences in luminance if the differences are larger than about 1%, between an object and its background. On the other hand, an eye with poor sensitivity needs larger differences, or, in other terms, it has a contrast sensitivity threshold larger than 1%.

As an example of change in contrast sensitivity due to changes in ambient conditions and not from the vision system, it can be shown that if, in a dark room, one turns on 60 lamps, each one of 8 watt power, all with the same power-to-light conversion efficiency the healthy vision system will notice the change in brightness on a wall of the room caused by the turning on or off of one 8 Watt lamp, because this event causes a change in brightness of $1/60$ or 1.67%, which is greater than the needed 1%.

However, if a strong 1000 Watt light is introduced in the room the new sensitivity threshold is increased to about:

$$(1000+8*60)/100=1480/100,=15 \text{ Watt}$$

and the vision system will no longer detect the turning on or off of an 8 Watt lamp.

The increase of sensitivity when ambient brightness decreases shows that they move, with some delay, in opposite directions. This "negative feedback control loop" is the engine of the eye adaptation capability, and it adapts well to light changes in the time domain, to produce a properly exposed image.

On the other hand the auto-exposure engine of the eye does not have a defense mechanism when the changes in light are strong and between different zones of the visual field.

As all the control actions of the auto-exposure parameters take effect over the entire eye, it is not possible, for example, to decrease or increase by a meaningful amount the sensitivity of the photoreceptors of one section of the retina relative to a different section.

A consequence of this incapability is that a strong light reaching the retina from one side of the visual field will cause a negative reaction of the auto-exposure function that will reduce the light collected and will darken the entire image, including parts already dark of the image, with obvious loss of vision acuity in those parts.

The opposite will take place if the eyes are shielded from the strong light: the entire image will brighten and vision acuity improve. Everyone who has experienced using one's hand to stop the sunlight from reaching the eyes, knows that the result is the making brighter and visible what was dark and underexposed.

"Light" is that range of the radiation spectrum, from about 400 to 700 nanometers in wavelength, to which the human eye is. However the human eye does not respond equally to all wavelengths. For example, the human eye is much more sensitive to green and yellow than to red and blue.

For this difference in sensitivity, a meaningful measurement of light intensity must take into account the eye sensitivity response. In mathematical terms, to calculate "luminance", for each wavelength the radiation measurement at each wavelength is multiplied by the sensitivity of the eye at that wavelength.

This makes the luminance a meaningful measurement of the physical radiation that causes the "visual sensation" of "brightness", which it is used to indicate how much more or less an object appears lighted up.

The blinding effect of sunlight and glare has long been minimized with filters that reduce light transmission or with frames structures that cut down the field of view of the eyes. These solution achieve the goal of reducing the problem, but progress can be made by exploiting the functionality of the eye-brain auto-exposure engine.

SUMMARY OF THE INVENTION

According to the invention, optical light filtering elements of different filtration properties are disposed in a tessellated, i.e., mosaic arrangement adjacent to one another to completely cover the field of view of the eye with the result of enhancing visual acuity.

It is thus one object of the present invention to maximize vision acuity and to minimize vision problems due to insufficient contrast sensitivity in low ambient light or in scattered or backlit light conditions.

Another object of the present invention is to provide eyewear, in particular, but not limited to, eyeglasses having lenses made of specialized patterns of multiple light filters of different filtration properties, hereto called "multi-filters patterns".

Another object of the present invention is to provide eyewear, and particularly eyeglasses, in which each lens is made of specialized patterns of multiple light filters of different filtration properties, with each pattern designed to enhance contrast sensitivity in specific zones of the visual field.

A further object of the present invention is to provide eyewear having lenses made of multi-filters patterns to enhance vision in tasks like, but not limited to, aiding work at a bench or desktop, or taking an outdoor walk under dappled sunlight conditions, or target shooting, or reading music sheets while playing an instrument, or working at a computer screen in an ambient with disturbing light sources around, or evaluating the quality of products traveling on a conveyer belt on a production floor, and in all tasks where improved contrast sensitivity in a specific part of the visual field increases productivity or safety.

A further object of the present invention is to provide eyewear having lenses made of multi-filters patterns to aid people with special vision needs due to disabilities or disease or vision decline by old age Such multi-filters patterns, customized for a specific visual need, adjusts the filters contours and properties to the vision acuity performance of the retina, to maximize the contrast sensitivity of the best performing parts of the retina of the user.

A still further object of the invention is to enhance prescription eyewear with the addition of multi-filters patterns technology.

Another object of the present invention is to provide eyewear with lenses made of multi-filters patterns in which the borders separating one filter area from the others have smooth transitions of the filtering properties yielding eyewear more esthetically acceptable.

Another object of the present invention is to provide eyewear with lenses made of multi-filters patterns in which the transitions areas, occupy most or all lens area.

In a specific embodiment of the invention, eyewear is provided in which contrast sensitivity is enhanced using lenses made of specific patterns of multiple light filters of different filtration properties, hereto called "multi-filters patterns". An eyewear lens that mounts a multi-filters patterns, in accordance with the present invention, has one or more areas of dark filters that highly reduce or totally block light transmission, and it has one or more other areas with weak or clear filters that reduce little or none light transmission The resulting structure, when worn, forces the auto-exposure function of the eye-brain vision system to adjust itself solely, or mainly, to the areas of high light transmission, resulting in better contrast sensitivity in those areas.

Another object of the present invention is to provide eyewear, having lenses made of multi-filters patterns, that include a clip-on mechanism to attach said eyewear to standard eyeglasses, so that contrast sensitivity enhancements is added to standard eyewear, when the clip-on with the multi-filter pattern is attached to it.

These, other objects of the invention, and other intended features, will become more easily visible when reference is made to the following description and the accompanying drawings.

DETAILED DESCRIPTION OF THE INVENTION

Figure 1:
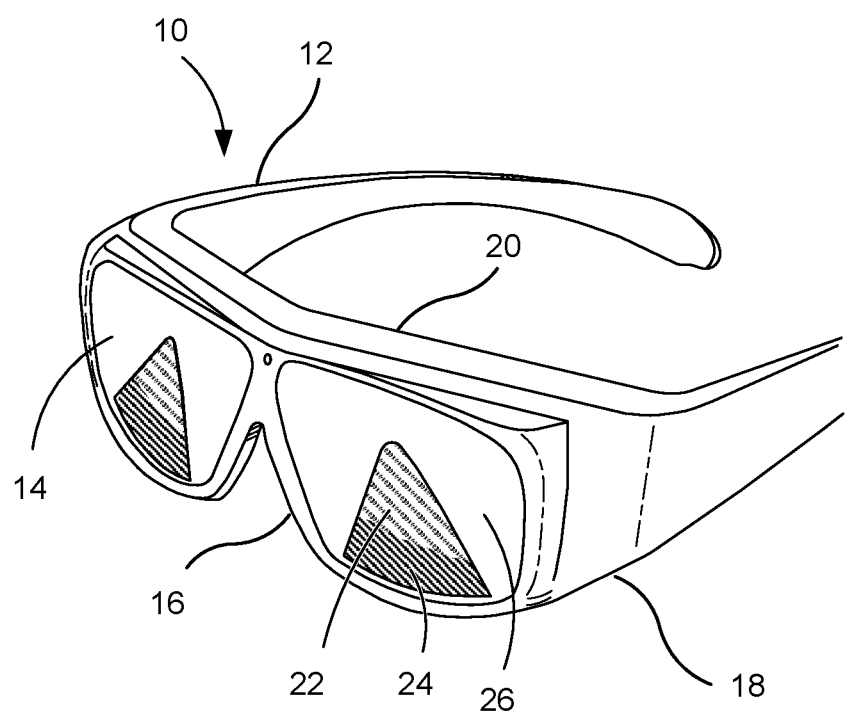
FIG. 1 illustrates a first embodiment of eyeglasses according to the invention and specifically with multi-filters pattern designated DT-TRI01/C-VH/B-M/P-VL in both lenses.

In describing specific embodiments of the invention illustrated in the drawings, a set of terms will be used for clarity. It is not intended that the invention be limited by the selected terms, but each term is intended to include all technical equivalents that operate in a similar manner to accomplish a similar purpose.

Optical filters are materials that selectively transmit light of different wavelengths. As some wavelengths may be filtered more than others and as the human vision senses wavelengths as colors a filter generally outputs light of a color different from the color of the light entering it. Filters that do not alter the wavelengths transmission profile, or spectrum, do not change the color of the light and are called "Neutral Density" filters or, hereafter, neutral filters.

The light transmission coefficient of a filter defines the percentage of light energy transmitted. A "strong" or "dark" filter refers to a high level of absorption and, consequently, a low level of transmission, which makes the filter material to appear dark, or close to black, while a "weak" or "light" filter refers to low absorption and high transmission which makes the filter material to appear light, or close to clear.

It is useful to define some terms hereto used to describe real-life light conditions.

The term "backlit" refers to a condition in which there is a light source behind or on the side of the object of interest in the visual field and the intensity of the light is strong enough to darken the object of interest in the eyes of the viewer.

The term "dappled light" refers to a condition in which bright and dark spots of light are mixed in a random pattern, as one may encounter under trees that, in a sunny day, filter the sun light more here and less there.

The term "uniform light" refers to a condition in which differences in brightness in the visual field are limited like one may encounter in a bright and cloudy day where the sunlight is scattered in all directions.

The term "high contrast" refers to a condition in which differences in light intensity in the visual field are large enough to reduce vision in the dark spots, as one may encounter in a sunny day with clear sky where the sunlight creates bright areas and dark shadows.

In estimating "brightness" or the "perception of brightness", this description will use terms like "about" or "approximately" because in the human vision the perception of light is not a linear function of the light energy received by the eye. In other words, if the light energy received doubles, the perception will increase but it will not double.

Noting that:
light-to-perception relationship is approximately logarithmic;
light perception is affected by ambient light, i.e. a candle appears brighter in a basement than outdoor;
the eye could be in an adaptation phase and changing its sensitivity;
the health of the optic nerve may affect the integrity of the image data collected in the retina, and the brain can;
a) decode the image from incorrect data,
b) miscalculate the ambient light measurement and setting the wrong sensitivity in the photoreceptors.

For the mentioned reasons, all eye performance estimations given in the description of the present invention are approximations and are intended to be preceded or followed by terms like "about" or "approximately", even if these terms do not appear in the text close to the given estimations.

FIG. 1 shows one embodiment of the present invention in a pair of eyeglasses 10, having eyeglass frames 12 that support a right lens 14 and a left lens 16 made of any material suitable for an eyeglasses light filtering function, like low cost colorized plastic, such as polycarbonate, or high quality glass with organic dyes and metallic oxide pigments, or light reduction coatings applied to the lenses surfaces, or any other process that results in controlling light absorption and transmission.

In the embodiment of FIG. 1, both lenses 14 and 16 mount one of the many patterns of multiple filters patterns possible with the technology of the current invention. The specific pattern shown in FIG. 1 is designated herein by an abbreviations specifying the type of device, in this case, as DT-TRI01/C-VH/B-M/P-VL. It is intended for general vision improvement.

It is here noted that for some applications or for some user's needs, the two lenses may use two different multi-filters patterns.

Figure 2:
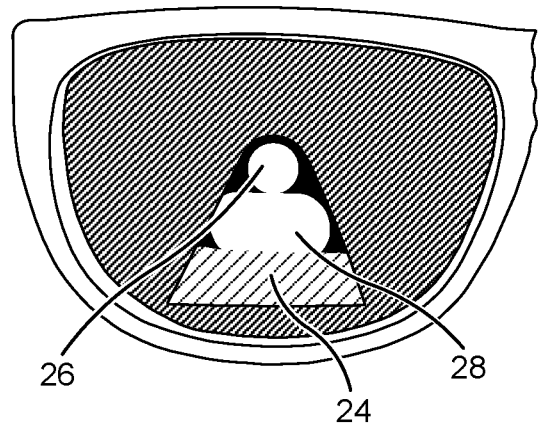
FIG. 2 illustrates the central zone C-VH of multi-filters pattern DT-TRI01/C-VH/B-M/P-VL.

The lens of multi-filters pattern DT-TRI01/C-VH/B-M/P-VL is composed of three filter areas: a central triangular area 22, designated as C-VH, which covers about ¼ or 25% of the visual field of the eye; a trapezoidal-shaped area 24, designated as B-M, which also covers about 25% of the visual field. The rest of the lens is designated P-VL. FIG. 2 shows how the central triangular area 22 is the union of a central circular area 26 for medium to long distance vision and a lower horizontal area 28 for short distance and lower visual field vision.

To optimize the effect of the present invention, frame 12 may include features that reduce or eliminate light reaching the eyes through paths other than lenses 14 and 16. These features may include, but are not limited to, a large lateral temple shield 18 and/or a horizontally disposed band 20 above the lenses 14 and 16.

The set of filters that compose the multi-filters pattern DT-TRI01/C-VH/B-M/P-VL have light transmission coefficients designed to selectively reduce the amount of light that would reach the eye. As described in the Background section, this light reduction induces an increase of sensitivity in the photoreceptors. As a consequence of this sensitivity increase, the image in the brain will get brighter. But, while in zones of the visual field heavily darkened by strong filters, this increase will not be noticeable, a zone lightly dimmed by its weak filter will visibly benefit and may generate an image brighter than it appeared before the wearing of the glasses with the multi-filters pattern.

For example, if the sensitivity gain is 30%, a zone filtered as much as 80%, will appear (1−80%)*(1+30%)=20%*1.3=26%, or very dark.

But a zone filtered only 10% will appear (1−10%)*(1+30%)=90%*1.3=117%, or brighter than before the wearing of the multi-filters pattern.

Furthermore, looking at a target of uniform brightness such as a grey wall while wearing a multi-filters pattern the brightness of each zone in the image in the brain can be controlled with the light transmission coefficient of the filter covering that zone. The filters, with their transmission coefficients, function as a quasi-brightness control, and make it possible, using a multi-filters pattern, to darken some areas of the visual field and to brighten others.

It is to be noted that the multi-filters patterns of the present invention operate on the photoreceptors inside the human eye and do not modify light rays paths as in vision devices that use magnifiers, prescription lenses, polarized lenses, pin-holes or other methods that act on the light rays before they reach the eye. It is also to be noted that the improvements generated by the multi-filters patterns of the present invention can be added to those created by other improvement methods that act on the light rays before they reach the eye, such as devices that use magnifiers, prescription lenses or pin-holes.

An additional benefit of the multi-filters pattern is that light sources or glare from outside zones of interest of the visual field will have their disturbances reduced or blocked by the strong filtering used in those zones.

It is useful to define some default test conditions to simplify the explanation of how the multiple filter technology of the present invention functions. Unless otherwise noted, all numerical quantities in this description have been estimated under the following conditions, hereto denominated "grey wall" conditions:

1. The scene in front of the viewer is a grey wall of uniform brightness;
2. All the light reaching the eyes passes through the two lenses 14 and 16;
3. All the filters used are neutral filters.

The conditions stated here are not necessary for the patterns of filters of the current invention to show vision improvements but are intended to allow a mathematical explanation of how the multi-filters patterns affect vision. For example, the multi-filters patterns of the current invention can use filters of any color, as the transmission coefficients used refer to the energy of the light and not to its color. This description uses neutral filters for simplicity of mathematical explanation only.

Pattern DT-TRI01/C-VH/B-M/P-VL is designed for generic vision improvement. As illustrated in FIG. 2 the central triangular filter area 22 is derived by the union of a central small area 26 for medium or long distance vision and a wider lower horizontal area 28 that allows, for example, the view of a plate while eating. The even lower trapezoidal area allows view of a floor during walking while wearing the glasses.

Using transmission coefficients of 80%, 40% and 20% for areas C-VH, B-M and P-VL produces the embodiment designated as DT-TRI01/80/40/20. The wearing of the DT-TRI01/80/40/20 embodiment in the stated test conditions will reduce the light reaching the retina from the grey wall down to about:

(80%/4+40%/4+20%/2)=40% of the original amount.

With the wearing of DT-TRI01/80/40/20 the lower part of the visual field will appear brighter than the ambient and the central zone of the visual field even brighter.

The trapezoidal area below the triangle is of medium light transmission for safer mobility, and the remainder of the visual field is further darkened to increase sensitivity to the central zone.

Using in configuration DT-TRI01/C-VH/B-M/P-VL, the transmission coefficients of 100%, 40% and 0%, respectively in areas C-VH, B-M and P-VL, produces the embodiment DT-TRI01/100/40/0, which, in the stated test conditions, reduces the light from the grey wall down to about:

(100%/4+40%/4)=35% of the incident light, further increasing photoreceptor sensitivity. The central triangular area, starting at 100% transmission, will appear brighter for the increased sensitivity. In addition, disturbing light sources from the periphery of the visual field are completely blocked and do not reduce photoreceptor sensitivity.

Using in configuration DT-TRI01/C-VH/B-M/P-VL the transmission coefficients of 100%, 0% and 0%, respectively in areas C-VH, B-M and P-VL, produces the embodiment DT-TRI01/100/0/0, which allows light transmission only in the central triangle. This cuts light to about 25% of the original, further increasing adaptation response, contrast sensitivity and vision acuity in this central area, which is the primary zone of interest while working at a task that requires focus and concentration.

It is to be noted that pattern DT-TRI01/100/0/0 gives no visibility outside the central zone of the visual field and is designed for non-mobile tasks. It is best suited, for example, for working at a desk in an ambient with disturbing light sources in and around the visual field.

Subjects with normal vision have been tested with pattern DT-TRI01/100/0/0. The test used a smart phone displaying grey letters of diminishing brightness on a black background at about three feet from the subject in a room illuminated at about 50 lux. The brightness of the screen was adjusted so that the subject under test could easily read the brightest letters but could not read the darkest ones.

First, the subject was asked to read as many letters as possible. Second, a light source of about 2000 lux was placed at about three feet right of the target screen and the subject was asked to read the chart again. In every case the subject lost vision and could not read as many letters as previously.

In the third and final step, with the 2000 lux light still on, the subject wore DT-TRI01/100/0/0 and read the chart again. In every case the subject was able to read more letters than without the glasses. When questioned about change in vision when wearing the multi-filter type patterns, the subjects estimated the improvement at 10% to 30%.

Figure 3:
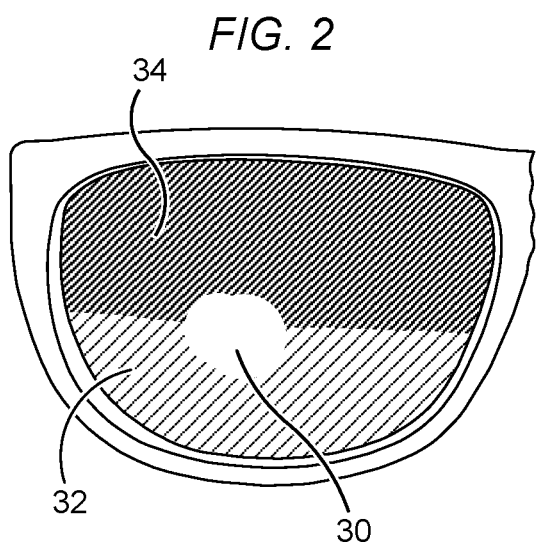
FIG. 3 illustrates the multi-filters pattern DT-OVL01/C-VH/B-ML/T-VL, in accordance with the present invention.

FIG. 3 shows another embodiment of the present invention, designated as DT-OVL01/C-VH/B-ML/T-VL, optimized to improve vision acuity in the center of the visual field, which can help in activities such as, but not limited to, target shooting or monitoring a detail of the visual field from distance.

The multi-filters pattern DT-OVL01/C-VH/B-ML/T-VL is composed of three filter areas, designated as C-VH, B-ML and T-VL. Area C-VH 30 is an oval or circular area that projects to the eye about 10% of the visual field from the center of it. Area B-ML 32 covers the lower half of the lens not taken by C-VH. Area T-VL 34 covers the upper half of the lens not taken by C-VH.

Using filters with transmission coefficients of 90%, 30% and 10% respectively in areas C-VH, B-ML and T-VL and having C-VH covering about 10% of the visual field produces the embodiment designated as DT-OVL01/90/30/10 which reduces the light reaching the eye down to about:

(90%*10%+30%*45%+10%*45%)=27% or a reduction of about 73%.

In uniform or dappled light conditions the central zone of the visual field, covered by area C-VH, receives three and nine times the light received from the other two zones, covered by B-ML and T-VL, with noticeable increase in perceived brightness and color saturation in the central zone of the visual field.

Figure 4:
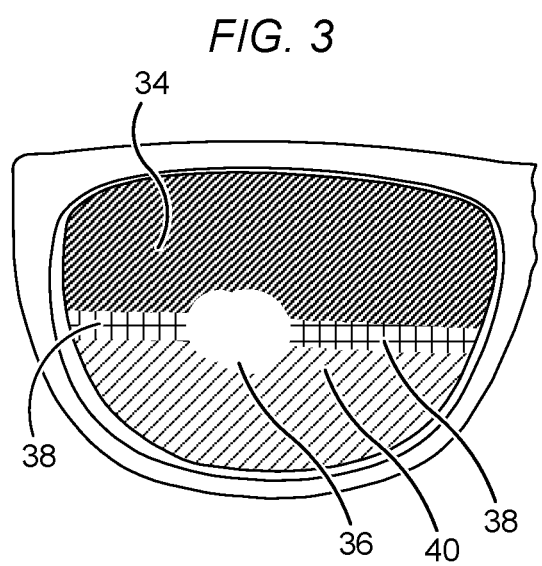
FIG. 4 illustrates the multi-filters pattern DT-OVL02/C-VH/H-HB-ML/T-VL, in accordance with the present invention.

For applications where the viewer wants improved visibility left and right of the center, DT-OVL01/C-VH/B-ML/T-VL can be modified into embodiment DT-OVL02/C-VH/H-H/B-ML/T-VL, as shown in FIG. 4, by adding a fourth area 38, designated as H-H. H-H runs left and right of C-VH 36, and below area 42 and above area 40, and it has a transmission coefficient equal or close to the coefficient of the central area C-VH. The horizontal shaped H-H, for example, allows a hunter to scan the zones left and right of the center of the visual field without much movement of the head.

Figure 5:
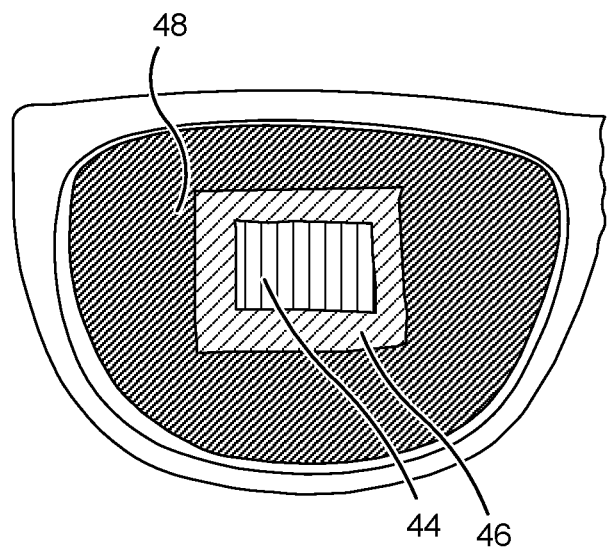
FIG. 5 illustrates the multi-filters pattern DT-RECT01/R1-VH/R2-MH/P-VL, in accordance with the present invention.

FIG. 5 shows another embodiment of the present invention, designated as DT-RECT01/R1-VH/R2-MH/P-VL, optimized to improve vision acuity in activities like, but not limited to, reading a book, or reading music sheets while playing an instrument, or working at a computer screen in a setting with disturbing light sources in the visual field. The multi-filters pattern DT-RECT01/R1-VH/R2-MH/P-VL is composed of three filter areas designated as R1-VH, R2-MH and P-VL. R1-VH 44 projects to the eye a rectangle of about 18'×12' standing in the center of the visual field at about two feet away from the eyes. Area R2-MH 46 extends the target rectangle to about 21'×15'. Area P-VL 48 covers the rest of the visual field.

Using filters with transmission coefficients of 90%, 60% and 10% respectively in areas R1-VH, R2-MH and P-VL produces the embodiment designated as DT-RECT01/90/60/10 which reduces the light reaching the eye down to about 25%, or a reduction of about 75%, which produces the vision improvements described for other embodiments.

Figure 6:
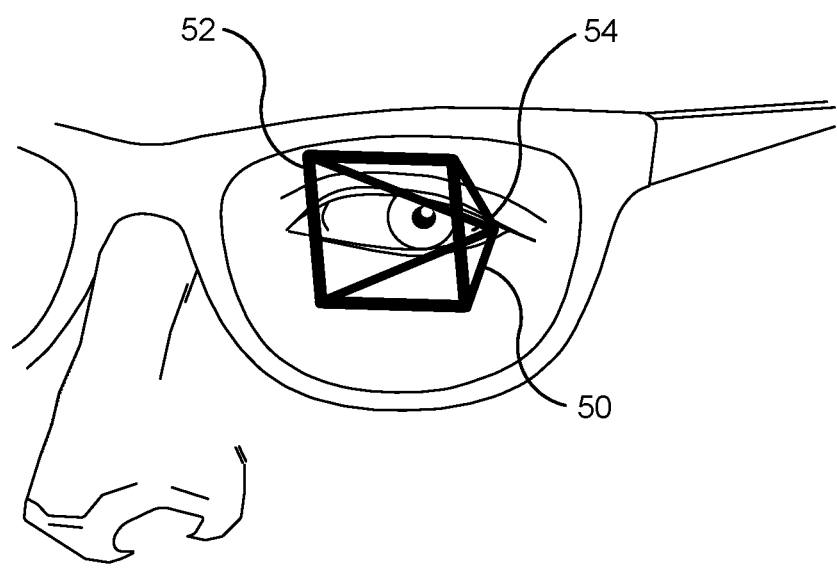
FIG. 6 illustrates the "viewing pyramid", defined by a rectangle drawn on an eyeglasses lens as the base of the pyramid and the center of the retina in the eye as its vertex.
Figure 7:
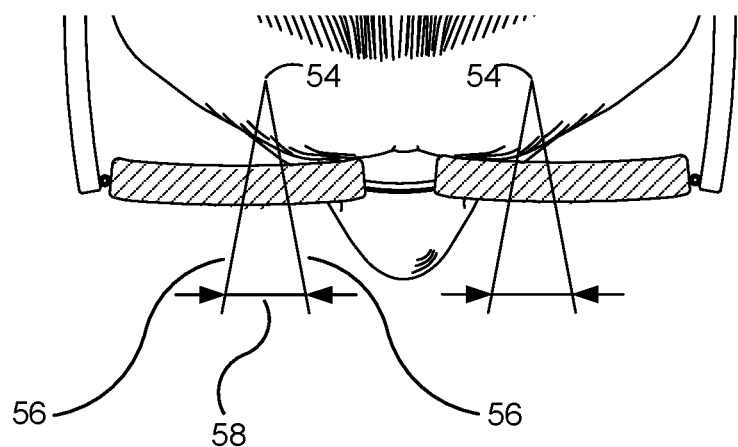
FIG. 7 illustrates the vertical section of the field of view projected to the eye by the vertical sides of the viewing pyramid.

FIG. 6 shows how a rectangle 52 drawn on a eyeglass lens together with the center of the retina 54 define a "viewing pyramid" 50 with the rectangle 52 as its base and the center of the retina 54 as its vertex FIG. 7 shows a view from above of a human head with glasses with the horizontal viewing angle 58 of the visual field delimited by the vertical sides 56 of the viewing pyramid 50.

Figure 8:
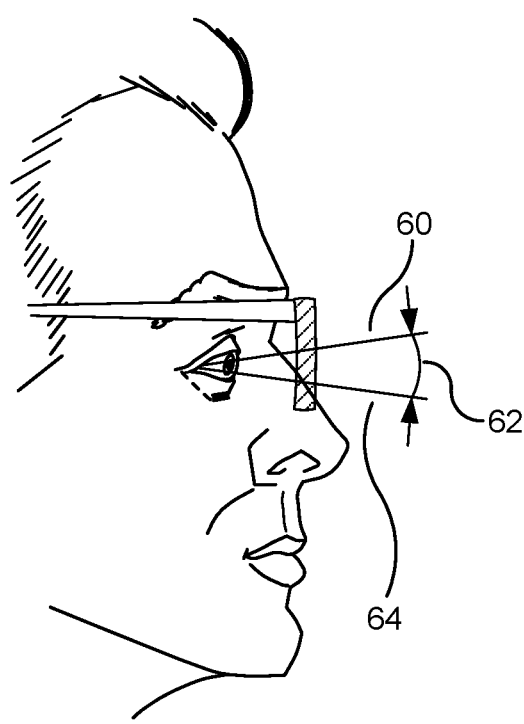
FIG. 8 illustrates the horizontal section of the field of view projected to the eye by the top and bottom sides of the viewing pyramid.

FIG. 8 shows a view from the side of a human head with glasses with the vertical viewing angle 62 of the visual field delimited by the top 60 and bottom 64 sides of the viewing pyramid 50.

Figure 9:
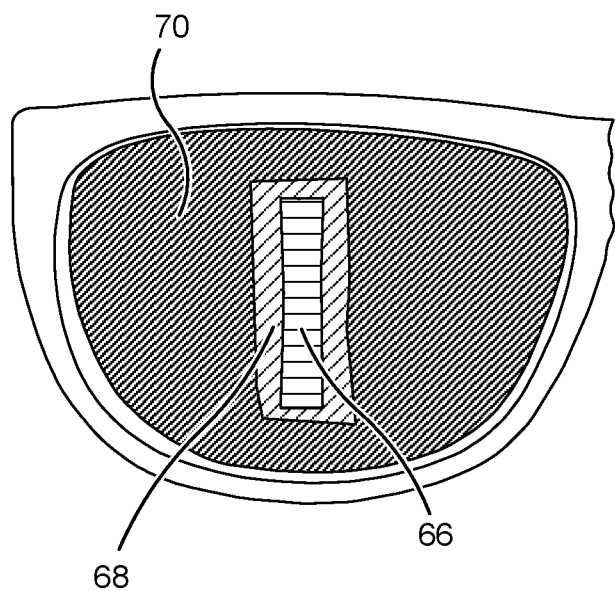
FIG. 9 illustrates the multi-filters pattern DT-VERT01/V1-VH/V2-MH/P-VL, in accordance with the present invention.

FIG. 9 shows another embodiment of the present invention, designated as DT-VERT01/V1-VH/V2-MH/P-VL, optimized to improve vision acuity in activities such as, but not limited to, evaluating the quality of products traveling horizontally on a conveyer belt, or judging the position of a target relative to a feature with a vertical profile in the visual field, as for example, a ball relative to a line in a tennis match.

The multi-filters pattern DT-VERT01/V1-VH/V2-MH/P-VL is composed of three filter areas designated as V1-VH, V2-MH and P-VL. V1-VH 66 is the base of a viewing pyramid that projects to the retina a horizontal viewing angle of about 10 degree and a vertical angle of about 45 degree. V2-MH 68 extends the horizontal viewing angle to about 20 degree and the vertical angle to about 60 degree. P-VL 70 occupies the rest of the lens.

Using filters with transmission coefficients of 90%, 60% and 10% respectively in areas V1-VH, V2-MH, and P-VL, produces the embodiment designated as DT-VERT01/90/60/10 which reduces the light reaching the eye down to about 33% or a reduction of about 67%, which produces the vision improvements described for other embodiments.

Figure 10:
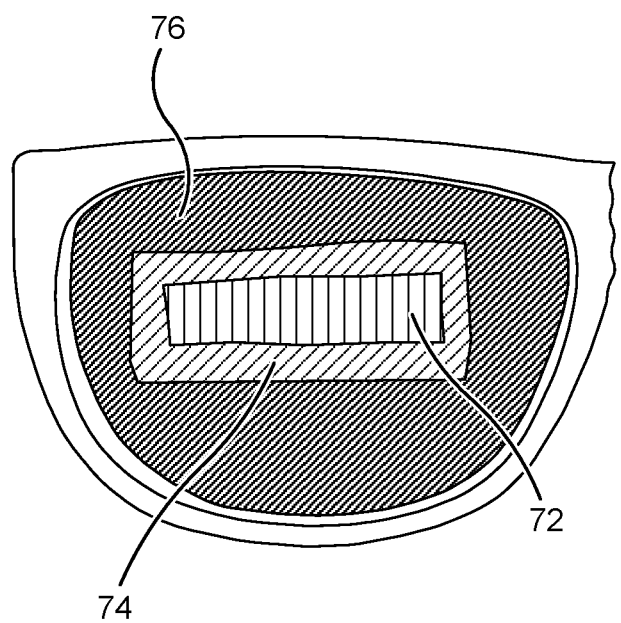
FIG. 10 illustrates the multi-filters pattern DT-HOR01/H1-VH/H2-MH/P-VL, in accordance with the present invention.

FIG. 10 shows another embodiment of the present invention, designated as DT-HOR01/H1-VH/H2-MH/P-VL optimized for improving vision acuity as it may be used in activities where the area of interest of the visual field is wide and horizontal, such as monitoring the surface of a body of water or coaching a team from the side of a soccer field. The multi-filters pattern DT-HOR01/H1-VH/H2-MH/P-VL is composed of three filters areas, designated H1-VH, H2-MH, and P-VL. H1-VH 72 is the base of a viewing pyramid that projects to the retina a vertical viewing angle of about 10 degree and a horizontal angle of about 60 degree. H2-MH 74 extends the vertical viewing angle to about 15 degree and the horizontal angle to about 90 degree. P-VL 76 occupies the rest of the lens.

Using filters with transmission coefficients of 90%, 60% and 10% respectively in areas H1-VH, H2-MH, and P-VL produces the embodiment designated as DT-HOR01/90/60/10, which reduces the light reaching the eye down to about 25% or a reduction of about 75%, which produces the vision improvements described for other embodiments.

Figure 14:
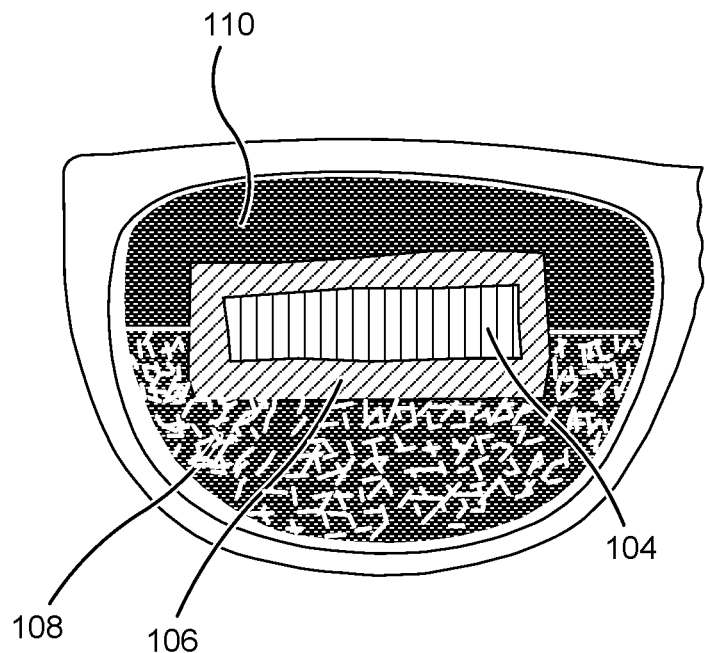
FIG. 14 illustrates the multi-filters pattern DT-HOR02/H1-VH/H2-MH/B-ML/T-VL, in accordance with the present invention.

FIG. 14 shows yet another embodiment of the present invention, designated as DT-HOR02/H1-VH/H2-MH/B-ML/T-VL optimized for improving vision acuity as it may be used in activities where the area of interest of the visual field is wide and horizontal and the activity requires some visibility of the surface over which the subject is moving, such as working on a sail-boat.

The multi-filters pattern DT-HOR02/H1-VH/H2-MH/B-ML/T-VL is composed of four filters areas, designated H1-VH, H2-MH, B-ML and T-VL. Area H1-VH 104, is the base of a viewing pyramid that projects to the retina a vertical viewing angle of about 10 degree and a horizontal angle of about 60 degree. H2-MH 106 extends the vertical viewing angle to about 15 degree and the horizontal angle to about 90 degree. B-ML 108 and T-VL 110 cover, respectively, the lower and upper parts of the visual field not occupied by H1-VH and H2-MH.

Using filters with transmission coefficients of 90%, 60%, 30% and 10% respectively in areas H1-VH, H2-MH, B-ML and T-VL produces the embodiment designated as DT-HOR02/90/60/30/10, which reduces the light reaching the eye down to about 30% or a reduction of about 70%, which produces the vision improvements described for other embodiments.

As the multi-filters patterns of the present invention improve sensitivity in parts of the visual field at the cost of darkening other parts, the shape design of the pattern of filters plays an important role in the vision improvement. The goal of a specific filter pattern can be, but is not limited to, to improve vision on a specific target or a critical area such as a swimming pool for a life-guard, a field line for a tennis linesman, or a small spot for an assembly worker that rejects or accepts products based on vision.

A further capability of the multi-filters patterns of the present invention is adjustment of the contour and filtration properties of the filters in a customized multi-filters pattern to match the acuity of the retina of the user. Such a customized pattern should have low transmission filters to cover those parts of the retina that have low vision acuity but that still affect the auto-exposure function, and should have high transmission filters to cover those parts of the retina that have the best vision acuity. Such a distribution of filtration properties will push the auto-exposure system to adjust itself to the best performing part of the retina, maximizing their performance.

Figure 11:
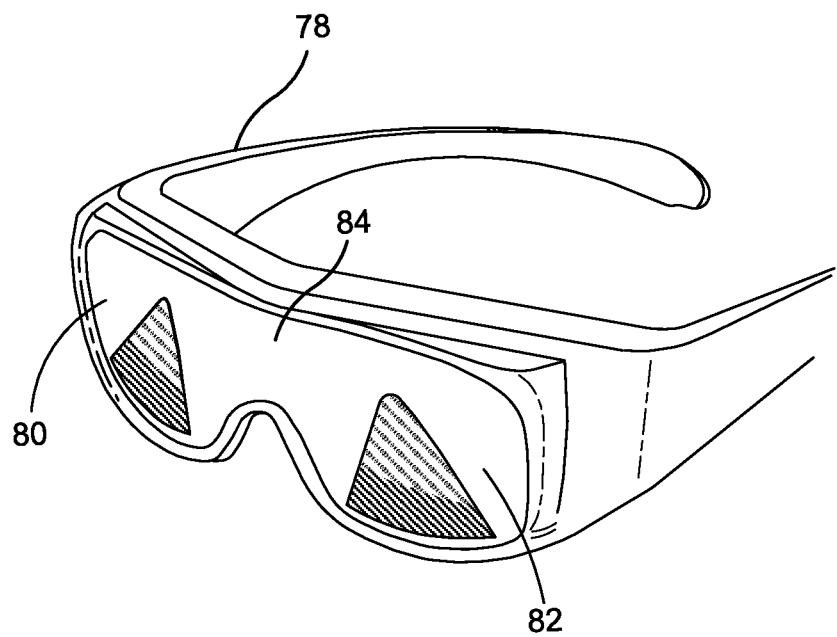
FIG. 11 illustrates a pair of eyeglasses with two side lenses joined together, with each side lens incorporating a multi-filters pattern, in accordance with the present invention.

FIG. 11 shows another embodiment of the present invention, wherein eyeglasses frame 78 holds a lens with two side, a right side lens portion 80 and left side lens portion 82, with a bridge 84 joining the two lens portions at a central location. Each side lens can implement any multi-filters pattern of the present invention, as it shows, as an example in FIG. 11, with multi-filters pattern DT-TRI01/C-VH/B-M/P-VL.

Figure 12:
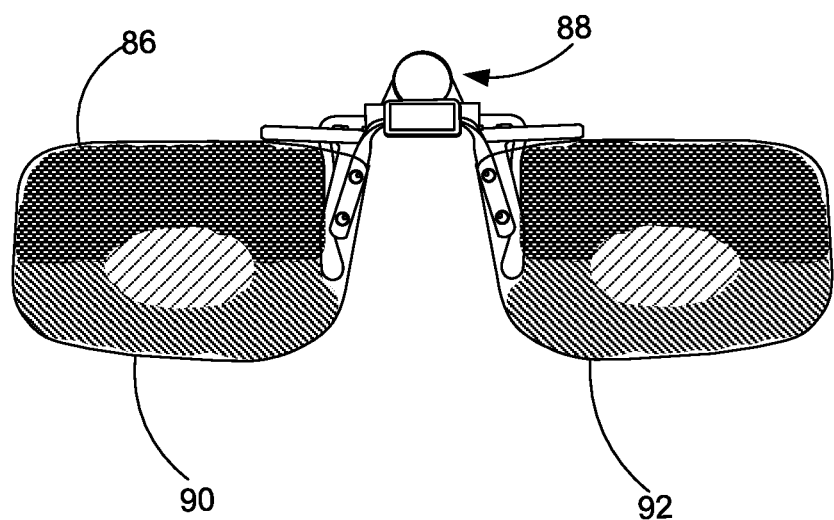
FIG. 12 illustrates a pair of clip-on eyeglasses with attachment mechanism to standard eyeglasses, that holds two lenses, each one incorporating a multi-filters pattern, in accordance with the present invention.

FIG. 12 shows another embodiment of the present invention in a clip-on 86 for regular eyeglasses. It includes a clip-on mechanism 88 with a frame for holding lenses 90 and 92 made according to the present invention. Any of the recited transmission patterns may be incorporated into this embodiment. Most or all light reaching the wearer's eyes passes through lenses 90 or 92. Right lens 90 and left lens 92, either or both, incorporate one of the multi-filters pattern of the present invention in front of each eye. FIG. 12 shows, as an example, clip-on eyeglasses 86 using multi-filters pattern DT-TRI01/C-VH/B-M/P-VL in both lenses, which produces the vision enhancements described for this pattern.

Figure 13:
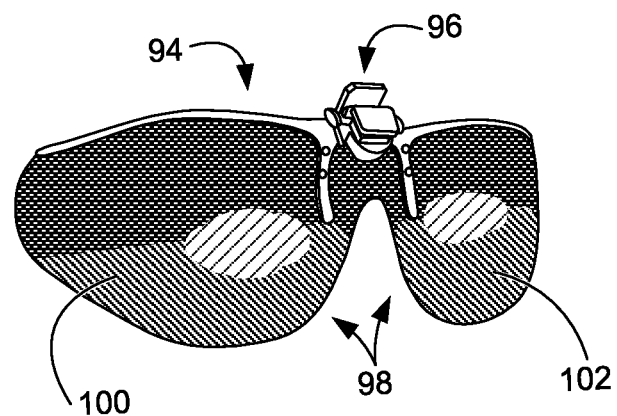
FIG. 13 illustrates a pair of clip-on eyeglasses with attachment mechanism to standard eyeglasses, that holds a single lens, made of two side lenses, joined at the center, with each side lens incorporating a multi-filters pattern, in accordance with the present invention.

FIG. 13 shows another embodiment of the present invention in a clip-on 94, having clip-on mechanism 96 holding a single-piece lens set 98. Mechanism 96 allows attachment of the clip-ons 94 to standard eyewear so that most or all light reaching the wearer's eyes passes through lens 98.

Right side 100 and left side 102 of lens set 98, either or both, incorporate one of the multi-filters pattern of the present invention in front of each eye. FIG. 13 shows, as an example, clip-on eyeglasses 94 using multi-filters pattern DTTRI01/C-VH/B-M/P-VL in each side 100, 102 of lens set 98, which produces the vision enhancements described for this pattern.

The multi-filters patterns designer can mitigate the concerns of those who find it to be objectionable to wear on their faces devices with strong features. For example a pattern designated DT-TRI01/80-40-20 is a "smoothed" version of DT-TRI01/80/40/20 in which the change in properties from one filter area to an adjacent area is progressive, that is, it gradually varies in transmissivity with position on the lens set 98 to create a soft transition between filters. Soft transition and reflective coating on the lenses can make the pattern lines practically invisible, In an extreme implementation, the transitional regions extend deep in the filters areas occupying most or all the areas.

Glasses with multi-filters patterns described hereinabove improve vision in zones of the vision field by darkening other zones of the same field or by creating blind spots. Thus caution is needed when wearing these glasses, especially when engaged in mobile activities, such as walking, running or driving.

The foregoing descriptions and drawings are only an illustration of the principles of the invention. Those skilled in the art may easily find applications for these principles. Thus, there is no intention to limit the invention to the constructions and functionalities herein described, except as indicated by the appended claims.

What is claimed is:

1. A device for improving visual acuity comprising:
an eyeglass lens holder;
at least one lens attached to the lens holder;
said at least one lens formed with a multi-filters pattern comprising a tessellated or mosaic arrangement of lens areas of different light transmission properties;
said multi-filters pattern having at least a first filtering lens area having first light transmission coefficient and at least a second filtering lens area adjacent said first filtering lens area having a second light transmission coefficient of lower value than the first light transmission coefficient for reducing light transmission to an eye;
said first filtering lens area being disposed at a position of a primary viewing region of the eye visual field and being partially or completely surrounded by said second filtering lens area such that light reaching the eye through the at least one lens is reduced and sensitivity of the eye is increased, to promote improved visual acuity in zones of the visual field covered by filters with high light transmission into a viewer's eyes when said device is worn, wherein the first filtering lens area is shaped as a rectangle within the second filtering lens area, and
the second filtering lens area includes multiple filtering lens areas, and the second light transmission coefficient includes multiple different light transmission coefficients each associated with an area of the multiple filtering lens areas,
wherein a first area of the multiple filtering lens areas is of a rectangle shape and completely surrounds the first filtering lens area, and a second area of the multiple filtering lens areas completely surrounds the first area.

2. The device of claim 1 wherein the first filtering lens area is shaped as the polygon having a rectangle shape.

3. The device of claim 1 wherein the first filtering lens area is shaped as the rectangle with a width greater than a height to provide a horizontal viewing angle of up to about 60 degrees and a vertical viewing angle of up to about 10 degrees, wherein the first area of the multiple filtering lens areas extends to a horizontal viewing angle of up to about 90 degrees and to a vertical viewing angle of about 15 degrees.

4. The device of claim 1 wherein the first filtering lens area is shaped as the rectangle with a height greater than a width to provide a horizontal viewing angle of up to about 10 degrees and a vertical viewing angle of up to about 45 degrees, wherein the first area of the multiple filtering lens areas extends to a horizontal viewing angle of up to about 20 degrees and to a vertical viewing angle of about 60 degrees.

5. The device of claim 1 further including a boundary region between the first filtering lens area and the second filtering lens area wherein light transmission is continuously progressive between said first light transmission coefficient and said second light transmission coefficient.

6. The device of claim 1 wherein the eyeglass lens holder comprises one of a frame, a clipon, and a wraparound.

7. The device of claim 1 wherein a pair of said lenses are attached the eyeglass lens holder.

8. The device of claim 1 wherein the at least one lens comprises two of the first filtering lens areas disposed in the lens and each one aligned so to project a same zone of the visual field to one of the viewer's eyes.

9. The device of claim 1 further including at least one blinder configured to block incident light peripheral to the eye.

10. The device of claim 1 wherein at least one of the filtering lens areas is light sensitive so as to exhibit decrease in light transmission coefficient in proportion to ambient light intensity.

\* \* \* \* \*